United States Patent [19]

Levreault

[11] Patent Number: 4,575,861
[45] Date of Patent: Mar. 11, 1986

[54] QUADRATURE MULTIPLEXED POST CORRELATION IF CHANNEL

[75] Inventor: Robert P. Levreault, Norfolk, Mass.

[73] Assignee: The Charles Stark Draper Laboratory, Cambridge, Mass.

[21] Appl. No.: 483,214

[22] Filed: Apr. 8, 1983

[51] Int. Cl.[4] .............................................. H04K 1/02
[52] U.S. Cl. ........................................ 375/1; 375/81; 375/115
[58] Field of Search ..................... 375/1, 81, 115, 120, 375/75, 102; 370/107, 20; 343/5 PN

[56] References Cited

U.S. PATENT DOCUMENTS

| | | | |
|---|---|---|---|
| 3,450,840 | 6/1969 | Vogt | 370/19 |
| 3,475,558 | 10/1969 | Cahn | 375/1 |
| 3,518,680 | 6/1970 | McAulfffe | 375/120 |
| 3,689,841 | 9/1972 | Bello et al. | 375/1 |
| 3,720,789 | 3/1973 | Clark | 370/18 |
| 3,748,385 | 7/1973 | Okano | 375/53 |
| 4,017,798 | 4/1977 | Gordy et al. | 375/1 |
| 4,041,391 | 8/1977 | Deekoski | 375/1 |
| 4,095,226 | 6/1978 | Kratzer | 375/1 |
| 4,164,628 | 8/1979 | Ward | 375/1 |
| 4,291,409 | 9/1981 | Weinberg et al. | 375/1 |
| 4,301,537 | 11/1981 | Roos | 375/1 |

OTHER PUBLICATIONS

"Skolnik" Naval Research Laboratory, Radar Handbook McGraw Hill Book Co., 1970, pp. 21-28, 21-29.

Primary Examiner—Robert L. Griffin
Assistant Examiner—Stephen Chin
Attorney, Agent, or Firm—Weingarten, Schurgin Gagnebin & Hayes

[57] ABSTRACT

An intermediate frequency (IF) amplifier having two separate signal paths through single amplification hardware. A radio frequency (RF) signal is separated into two identical signals which are separately processed to provide code and carrier signals. These signals are combined in quadrature and amplified together in the same IF strip, followed by two channel quadrature detection. The IF amplifier of the present invention is typically used in signal processing, and in particular, in spread spectrum receivers. The quadrature multiplexed IF channel affords uniform gain, bandwidth, phase and delay characteristics between the two separate code and carrier signal paths.

14 Claims, 5 Drawing Figures

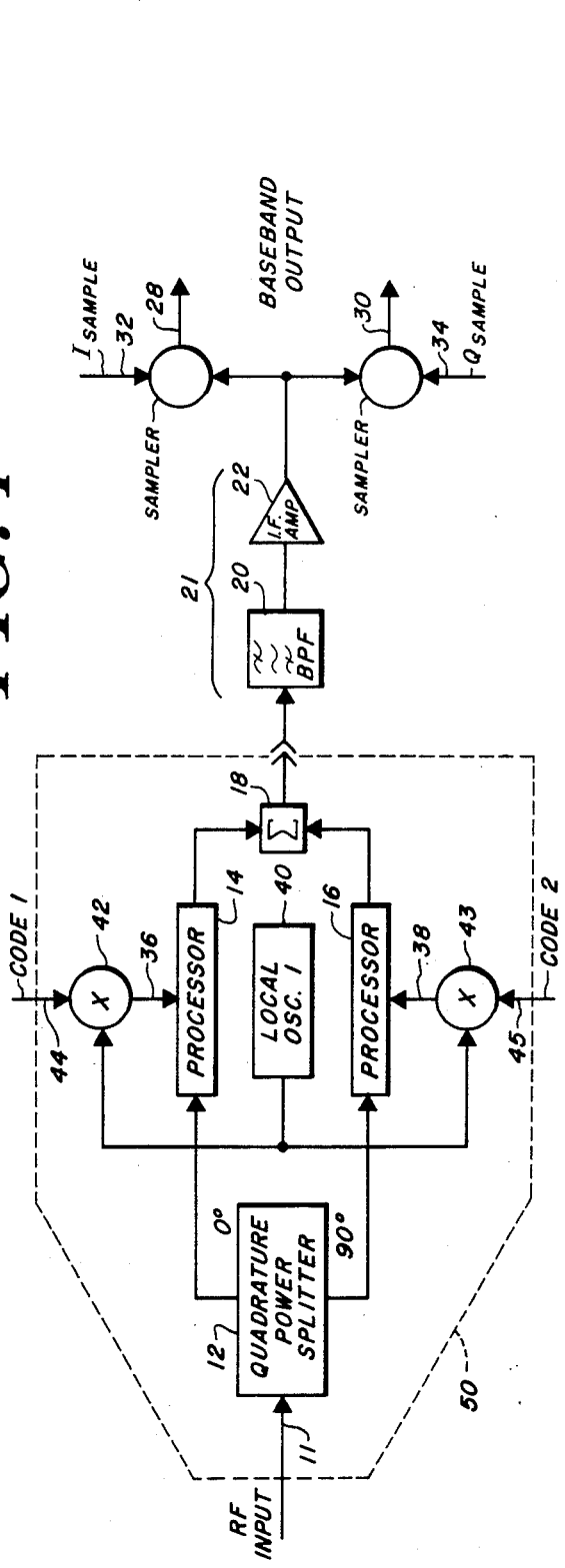
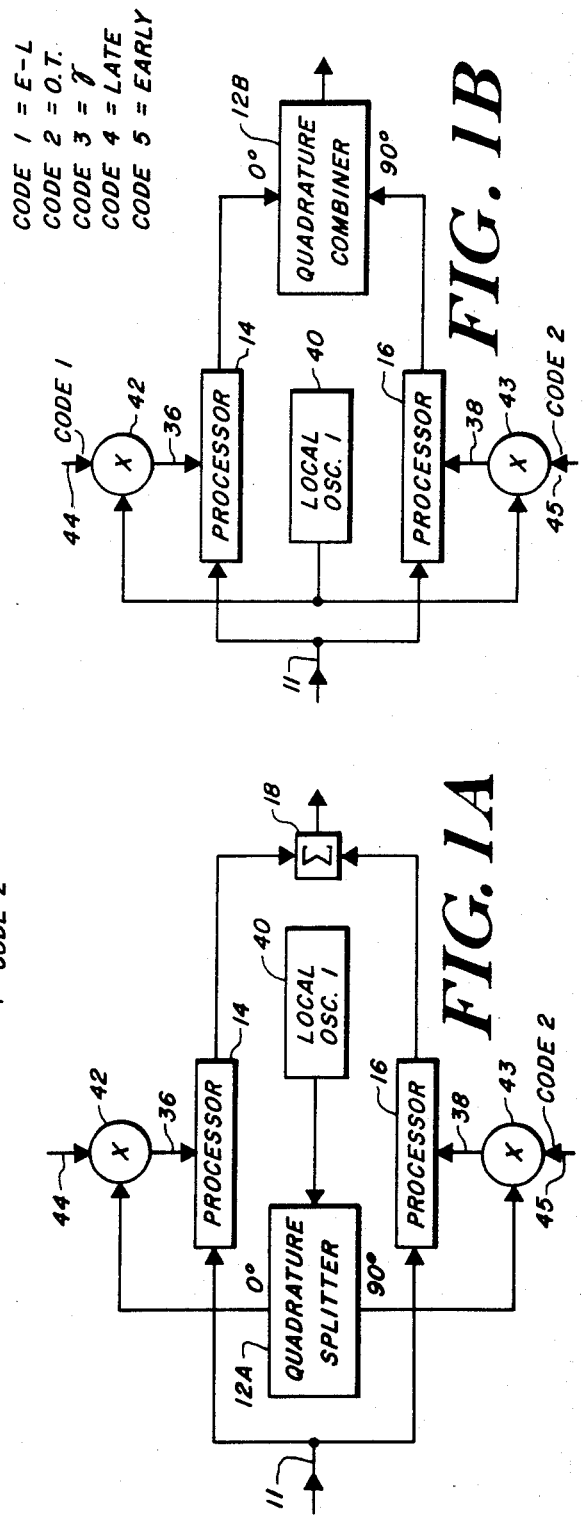

QUADRATURE MULTIPLEXED POST CORRELATION IF CHANNEL

FIELD OF THE INVENTION

The present invention relates to radio frequency amplifiers, and in particular, two channel intermediate frequency amplifiers used in spread spectrum receivers.

BACKGROUND OF THE INVENTION

Satellite navigation systems typically employ a spread spectrum communication feature in which a satellite transmits random code modulated signal containing data used to set receiver tracking clocks, and a repeating sequence of pseudo random codes to which the receiver synchronizes. The receiver will typically contain a code tracking loop in which the pseudo random code is generated and correlated with the incoming satellite signal, the locally generated code being time shifted until the correlation signal peaks, indicating that the timing of the code generation is synchronized to the receiver code timing. The receiver also establishes a carrier tracking loop which demodulates and phase tracks the reconstructed carrier signal for navigation purposes. The tracking loop functions typically modulates the received signal to produce the correlations with code and carrier signals before amplification at the intermediate frequencies (IF). The intermediate frequency stages in the receiver are where most of the gain of the receiver is provided wherein the intermediate frequency amplifier characteristic for both the code and carrier correlation signals must be carefully matched to maintain the desired carrier tracking loop S/N ratio. For instance, any relative phase differences between the loops will result in degraded tracking performance. The sophisticated and expensive intermediate frequency amplifiers thus require matching of hardware components and circuit conditions to allow exact characteristic matching and to avoid drifting.

SUMMARY OF THE INVENTION

The present invention utilizes a code and carrier tracking loop in which quadrature multiplexing is used to combine the two independent RF level outputs of code and carrier correlators in a single signal for IF amplification in a single IF strip. The use of a single IF strip eliminates the potential for amplification channel differences and secures navigation accuracy without the expense of matched IF strips. The amplified IF signal is quadrature demodulated wherein the in-phase and quadrature components are separated as code and carrier information signals. These signals are, in turn, separately utilized to generate the correction signals for the respective code and carrier loops that synchronize the receiver to the satellite signals.

In one embodiment of the present invention, a spread spectrum receiver provides a received signal initially converted to a first IF frequency. Correlation functions, carrier restoration and conversion to a second IF frequency are then provided in a second function. The code and carrier IF signals are then combined in phase quadrature and applied to a single IF strip having a third IF frequency conversion and substantial amplification.

In this system, the signal resulting from the first IF conversion is split into two signals. These signals are applied to the signal inputs of two separate signal processors, the processors respectively forming the code loop correlator and the carrier loop correlator. The correlators include a mixing function which provide outputs at a second intermediate frequency. The signals are then combined through an in-phase power combiner to form a composite second IF signal. A quadrature relationship between the combined signals is achieved by either quadrature splitting prior to the processors or quardature splitting in the combiner. The composite, second IF signal is then amplified by a single IF amplifier strip. The IF amplifier strip includes conversion to a third IF frequency which is suitable for sampling detection. A quadrature sampler/detector performs quadrature detection on the third IF frequency signal, separating the individual signals corresponding to the code and carrier correlation modulation functions mentioned above, and providing these signals in a baseband form. In this manner, only one intermediate frequency amplifier strip is used for both loops, and differential characteristics between the code and carrier signal resulting from separate IF amplification functions are eliminated.

Alternately, a quadrature signal relationship between the code and carrier loops is established by first quadrature separating the local oscillator signal applied to the mixers of the code and carrier correlators. The signals resulting from the operation of the correlators are in quadrature relationship by virtue of the quadrature local oscillator signals. Other embodiments of the present invention employ auto-correlation and cross-correlation circuits in the loop paths for code loop and carrier signals.

The present invention may be used with any spread spectrum receiver requiring an economical implementation of code and carrier loops. In addition, the present invention may be applied to broader applications wherein different and independent processing of the signal prior to its entering the intermediate frequency amplifier is desired, wherein uniform IF amplifier characteristics for each process are important.

BRIEF DESCRIPTION OF THE DRAWING

These and other features of the present invention are more fully described in the following, solely exemplary, detailed description and in the accompanying drawing in which:

FIG. 1 is a block diagram of one embodiment of the multiplexed IF amplifier channel according to the present invention;

FIG. 1A is a block diagram of an alternate embodiment of the front end of the amplifier channel of FIG. 1;

FIG. 1B is a block diagram of a second alternate embodiment of the front end of the amplifier channel shown in FIG. 1;

DETAILED DESCRIPTION OF THE INVENTION

Figure 2:
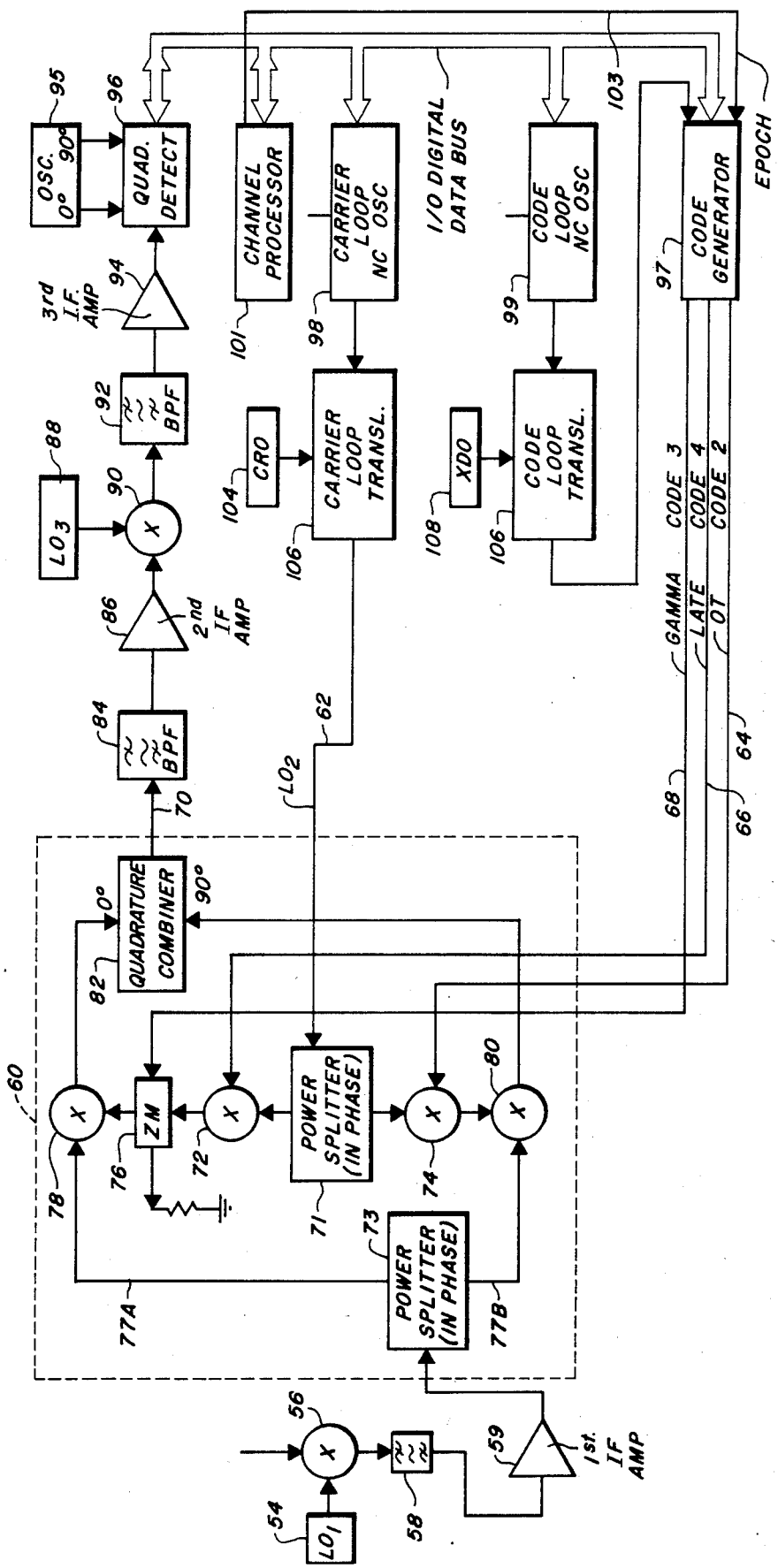
FIG. 2 is a block diagram of a portion of a spread spectrum receiver incorporating the multiplexed IF amplifier channel of the present invention.

FIG. 1 illustrates a multiplexed IF channel for a spread spectrum receiver in block diagram. A radio frequency (RF) signal, which may be another IF channel signal or a received signal is received at an input 11 of a signal quadrature power splitter 12. The power splitter 12 provides a first output reproduction of the RF input in-phase and a second reproduction of the RF input in a quadrature relationship to the first output. The first output is received by a first processor 14 to perform a first correlation modulation process for carrier loop tracking. The second output of the power divider 12 is received by a second processor 16 which provides correlation and frequency translation functions that may be similar or different from that of the first processor 14, as is necessary for code loop tracking. These processors typically comprise mixers, correlators, cross-correlators and bi-phase modulators. The first processor 14 and the second processor 16 typically include mixers to modulate the signal from power divider 12 by signals derived from a local oscillator 40 through code modulators 42 and 43. The signals received at the code inputs 44 and 45 of the modulators 42 and 43, respectively, are locally generated as in a complete system, such as in FIG. 2, shown below, where code 1 corresponds to an EARLY-LATE difference code and code 2 corresponds to an ON TIME code, both known in the art of code tracking receivers. The outputs from the first processor 14 and the second processor 16 are received by a summing network 18 which produces a composite output signal which is then applied to a bandpass filter 20 of a single, multiplexed IF strip 21. The bandpass filter 20 selects only the desired IF frequency signal and associated side bands, from among the several which are typically produced by processors 14 and 16. The subsequent amplifier 22 of the IF strip 21 will uniformly amplify signals received from both the first processor 14 and the second processor 16. The amplifier 22 output is received by an in-phase sampler 24 and a quadrature sampler 26 which recover at outputs 28 and 30, the baseband signals which correspond to each process performed by the first processor 14 and the second processor 16, respectively. The in-phase sampler 24 and quadrature sampler 26 receive periodic sample signals 32 and 34, respectively, which are related to the last conversion frequency of the IF strip 21 in such a way as to perform phase-sensitive detection and separate the two quadrature signal components.

The IF amplifier front end 50, shown in FIG. 1, may be alternatively configured according to the structure of FIG. 1A. As shown there, the RF input 11 signal is applied directly to both processors 14 and 16. The output of the local oscillator 40 is applied to a signal power divider 12A which produces quadrature-phased local oscillator signals. These signals are in turn code modulated by the dual code modulators 42 and 43, and applied to the inputs 36 and 38 of processors 14 and 16. The outputs of the processors 14 and 16 are quadrature-phased and are summed by the summation network 18 and amplified in the single IF strip 21 as described above.

A second alternate embodiment of the amplifier front end 50 is shown in FIG. 1B, where the input RF signal is applied to both the processors 14 and 16, and the output of the local oscillator 40 is code modulated by the dual code modulators 42 and 43, which is then applied to both processors 14 and 16 at their inputs 36 and 38, respectively. Both the input signals and the local oscillator signals are received in phase. The processor 14 and the processor 16 output signals are combined in quadrature by a quadrature power combiner 12B to produce the multiplexed signal applied to the IF strip 21 described above.

A complete spread spectrum receiver incorporating the multiplexed channel IF amplifier according to the FIG. 1B implementation of the present invention is shown in FIG. 2. A quadrature IF front end 60 provides respective cross-correlation and auto-correlation between the received signal and a set of signals generated within the receiver. A spread spectrum radio signal in the L band of approximately 1500 MHZ is received at an input of a mixer 56 where it is combined with a signal provided by a first local oscillator 54 to produce a first IF signal output. The mixer output 56 is filtered by a bandpass filter 58, at the first IF signal frequencies, and its output is applied to a first IF amplifier 59. The output of the amplifier 59 is applied to the quadrature IF front end 60 through a power splitter 73 providing a signal on leads 77A and 77B to both inputs of signal mixers 78 and 80, acting respectively as cross-and auto-correlators. The correlating signals applied to mixers 78 and 80 are developed within the front end 60 from a second local oscillator signal on a lead 62 and a group of code signals on leads 64, 66 and 68. The outputs of mixers 78 and 80 are at a second IF frequency which are brought into phase quadrature and summed by quadrature power combiner 82 to produce a composite output 70 at the second IF frequency, typically lower in frequency than the first IF frequency.

More particularly, the second best oscillator signal is provided on lead 62, and is split by power splitter 71 and modulated by the first and second code signals on leads 64 and 66 by mixers 72 and 74, respectively. The code signals on leads 64 and 66 represent ON TIME and LATE codes so the resulting modulation yields an ON TIME and LATE local replica at the output of the mixers 72 and 74. The output of the mixer 72 is then amplitude modulated by a gamma code (related to above codes), on lead 68 in a hybrid 76. This code modifies the LATE code to produce a local replica suitable for cross-correlation with the input signal 77A. The output of hybrid 76 is applied as the cross-correlating signal to mixer 78. The output of mixer 74 is applied as the auto-correlating input to the mixer 80.

As noted above, the outputs of the mixers 78 and 80 are applied to a quadrature power combiner 82 which provides a composit second IF signal output 70. This second IF signal forms the output of front end portion 60 and is filtered by a bandpass filter 84 and amplified by a second IF amplifier 86. The output of the second IF amplifier 86 is subsequently converted to a third IF frequency by mixing with the output of a third local oscillator 88 in a mixer 90. The output of the mixer 90 is filtered by a bandpass filter 92 at the third IF frequency. The output of the filter 92 is thereafter amplified by a third IF amplifier 94. The output of amplifier 94 is applied to a quadrature detector 96 which demodulates each quadrature signal separately in response to quadrature signals from oscillator 95, and converts the resulting signals to digital form for signal processing by the processor. The output signals of the mixers 78 and 80, in phase quadrature within the IF strip from summer 82 to detector 96, are thus separated at the quadrature detector 96.

The outputs of the detector 96 are digital representations of the amplitudes of the cross- and auto-correlation functions provided by mixers 78 and 80 which are further processed for range measurement and data detection of satellite information. These signals are utilized within the Global Positioning Satellite (GPS)

receiver in ways known in the prior art and the full details of their characteristics will not be repeated here.

The sampled outputs of the detector 96 are received by a processor 101 which, in turn from repeated samplings, determines the trend of the outputs so as to control a numerically-controlled carrier loop oscillator 98, a numerically-controlled code loop oscillator 99 and a code generator 97. The output of oscillator 98 is typically less than 60 MHz in frequency and is translated to the frequency of the second local oscillator by a mixer 102, driven by an oscillator 104. The processor 101 responds to output of the detector 96 to adjust the oscillator 98 to maximize this output. The second local oscillator is thus phase-locked to the carrier of the received RF signal. The phase-locking is provided according to the processing of the received signal with the associated local code signals. Data in the incoming detected signal is then utilized by the processor 101 for identifying the reference time for navigation purposes.

The code generator 97 is instructed by processor 101 as to which of several repeating pseudo random GPS codes is to be tracked. The pseudo random code is unique to each satellite and can be identified by information received from the particular satellite. The output of the numerically controlled code loop oscillator 99 is translated to the code clock frequency by the code loop translator 106 and the offset oscillator 108. The phase of oscillator 99 is controlled digitally by processor 101 to null the detected amplitude of the code loop signal. The nulling is a result of the cross-correlation function. Processor 101 shifts the time of commencement of the code from generator 97 over a triggering lead 103 until the correlation functions indicate the code timing is converging. Processor phasing of the loop is then accomplished with the control of oscillator 99. In this way, the code loop is also accurately and independently tracked where the amount of lead or lag code generation is used for position information.

Figure 3:
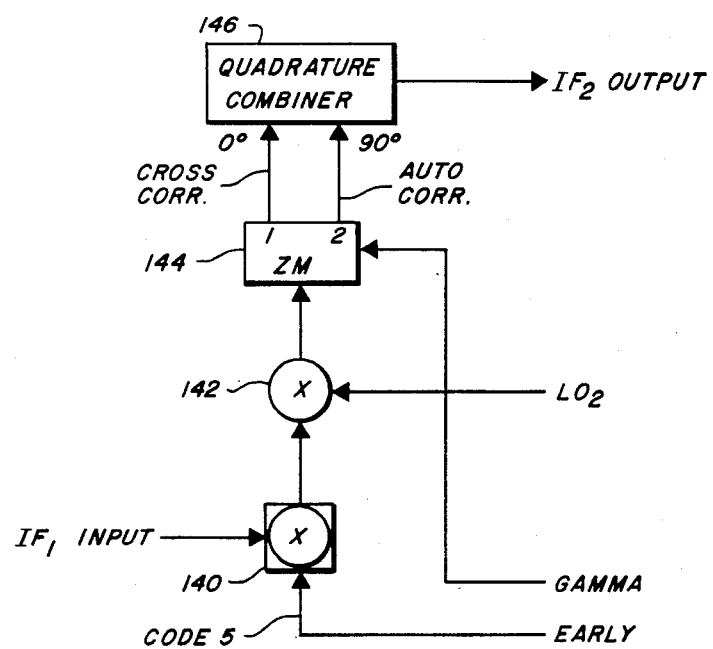
FIG. 3 is an alternate embodiment of the quadrature IF front end section of FIG. 2.

FIG. 3 shows a modified front end in which the RF or first IF input is applied to a correlator 140 which receives an EARLY CODE (code 5) output from the code generator of FIG. 2 representing an early version of ON TIME code 2. The output of correlator 140 is applied to a mixer 142 having local oscillator signal derived from the carrier loop translator 106. This translates the output spectrum of the correlator 140, to the IF frequency. The output of the mixer 142 is applied to hybrid modulator 144 which also receives the gamma code output from the code generator 97, as did network 76. This modulator 144 produces the two output correlation functions previously described for the code and carrier tracking loops, namely, the quadrature outputs of the mixers 78 and 80 in FIG. 2, which are then combined by quadrature combiner 146. The output signal from the quadrature combiner 146 is received by the IF amplifier filter 84, and further processed as described above.

The system described above permits IF input and multiplexing of the spread spectrum signal as found in satellite navigators to reduce sensitivity to divergent IF channel properties. The invention application outside the field of satellite navigators is to be construed in scope of the invention, which is to be limited solely by the following claims.

What is claimed is:
1. A receiver apparatus comprising:
a local oscillator providing a local oscillator signal;
a first code generator providing a first code signal; and
a second code generator providing a second code signal;
means for combining said first and second code signals, together with said local oscillator signal and said received signal in a quadrature relationship;
unitary intermediate frequency amplifier means receiving the output signal from the means for combining for providing an amplified output; and
detector means responsive to the intermediate frequency amplified output for forming a first and second detected output signals according to the information in said first and second code signals respectively.

2. The receiver apparatus of claim 1 wherein said means for combining includes processing means receiving a spread spectrum signal for forming first and second processed signals by a first and a second modulation processes.

3. The receiver apparatus of claim 2 further comprising means responsive to said first and second detected output signals for controlling said first and second modulation processes.

4. The receiver apparatus of claim 3 wherein:
said processing means includes means for demodulating said spread spectrum signal in response to said in-phase and quadrature signals.

5. The receiver apparatus of claim 3 wherein:
said processing means includes a signal correlator; and
said local oscillator signal and at least one of said first and second code signals are combined to provide a code modulated local oscillator signal for correlation with said spread spectrum signal by said correlation means.

6. The receiver apparatus of claim 5 wherein said signal correlation means comprises an auto-correlator and a cross-correlator for providing said first and second processed signals, respectively.

7. The receiver apparatus of claim 3 wherein:
said controlling means includes means for phase locking a local signal to said first output; and
said controlling means further includes means for phase locking a local code signal to said second detected signal.

8. The receiver apparatus of claim 3 wherein said means for combining further comprises:
first mixer means for mixing the output signal of the local oscillator with said first code signal; and
second mixer means for mixing the output signal of the local oscillator with said second code signal, wherein
said processing means includes means for mixing said spread spectrum signal and the output of said first mixer means and means for mixing the spread spectrum signal and the output of the second mixer means.

9. The receiver apparatus of claim 8 wherein said processing means includes a Bi-phase modulator.

10. The receiver apparatus of claim 8 wherein said combining means includes phase shift means wherein the output signals of said processing means for mixing are combined in a quadrature relationship.

11. The receiver apparatus of claim 8 further including:
code generating means for producing a third code signal; and hybrid mixer means for mixing said third code signal with an output of said second mixer means to provide a signal for one of said modulation processes.

12. The receiver apparatus of claim 11 further comprising channel processor means responsive to said first and said second detected outputs for producing a local oscillator control signal to control said local oscillator and at least one of said code generators.

13. The receiver apparatus of claim 3 further comprising:
   means to generate a third code; and
   means to generate an EARLY CODE,
   wherein,
   said processing means comprises:
   correlator means receiving said spread spectrum signal and said EARLY CODE;
   mixer means receiving the output of said correlator and said local oscillator signal;
   modulator means receiving the output of said mixer means and said third code producing a pair of output signals; and
   means to quadrature combine the output signals of the modulator means, providing an output signal received by said unitary intermediate amplifier means.

14. A multiplexed IF channel receiver for spread spectrum signals comprising:

a code recognition phase-locked loop having means responsive to a received spread spectrum signal for mixing it with an output resulting from mixing a phase-controllable locally generated code signal and a local oscillator signal;

a unitary IF amplification channel responsive to the mixed spread spectrum signal, said code recognition phase-locked loop further having means for detecting the mixed spread spectrum signal after amplification by said unitary IF amplification channel to recover a code signal in said spread spectrum signal and for phase-controlling said code signal in response to the recovered code signal;

a carrier-locked loop having means responsive to the received spread spectrum signal for mixing it with said phase-controllable locally generated code signal and said local oscillator signal;

means for applying the two mixed spread spectrum signals to said unitary IF amplification channel in phase quadrature; and said carrier-locked loop having means for detecting the IF channel amplified signal from the mixing means of said carrier loop independently from the IF channel amplified signal from the mixing means of the code recognition phase-locked loop and for controlling said local oscillator signal to provide carrier phase-locking to said received spread spectrum signal.

* * * * *